US010660343B2

(12) United States Patent
Starr et al.

(10) Patent No.: US 10,660,343 B2
(45) Date of Patent: May 26, 2020

(54) APPARATUS AND METHOD FOR MAKING SANDWICH

(71) Applicant: Hamilton Beach Brands, Inc., Glen Allen, VA (US)

(72) Inventors: William D Starr, Richmond, VA (US); Amy Hollister, Henrico, VA (US); Drew Carlson, Henrico, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 400 days.

(21) Appl. No.: 15/680,344

(22) Filed: Aug. 18, 2017

(65) Prior Publication Data

US 2019/0053503 A1 Feb. 21, 2019

(51) Int. Cl.
| | | |
|---|---|---|
| *A21C 9/06* | (2006.01) | |
| *A21D 13/32* | (2017.01) | |
| *A47J 43/08* | (2006.01) | |
| *A47J 43/00* | (2006.01) | |
| *A21C 9/04* | (2006.01) | |
| *A47J 37/06* | (2006.01) | |

(52) U.S. Cl.
CPC .............. *A21D 13/32* (2017.01); *A47J 43/00* (2013.01); *A47J 43/08* (2013.01); *A47J 37/0611* (2013.01)

(58) Field of Classification Search
CPC ........ A21D 13/30; A21D 13/32; A21D 13/42; A47J 43/00; A47J 43/04; A47J 43/08; A47J 43/20; A47J 37/0611

USPC ........ 99/353, 426, 427, 450.1, 450.2, 450.4, 99/450.5, 450.6, 450.7
See application file for complete search history.

(56) References Cited

U.S. PATENT DOCUMENTS

| | | | | |
|---|---|---|---|---|
| 2,582,692 | A | | 1/1952 | Funke |
| 3,817,163 | A | * | 6/1974 | Kizziar .................. A47J 43/18 99/353 |
| 4,439,124 | A | | 3/1984 | Watanabe |
| 5,405,256 | A | * | 4/1995 | Dalton ................... A21C 9/063 99/450.6 |
| 5,417,996 | A | * | 5/1995 | Brink ..................... A21C 9/063 425/343 |
| 2006/0144254 | A1 | * | 7/2006 | Foulon, Jr. ............. A21C 9/063 99/450.4 |
| 2007/0144359 | A1 | | 6/2007 | Ekberg et al. |
| 2008/0020106 | A1 | | 1/2008 | Carson et al. |
| 2014/0087041 | A1 | * | 3/2014 | Alley ................... A21C 15/007 99/450.1 |

(Continued)

*Primary Examiner* — Hung D Nguyen
(74) *Attorney, Agent, or Firm* — Alexander D. Raring

(57) ABSTRACT

An apparatus and method are provided for automatically making a pocket sandwich. The apparatus includes a platform configured to support a wrap (such as pita bread, tortillas, or the like) and a rotatable food pocket arranged at a center of the platform. A folding paddle is configured to rotate toward and away from the center of the platform, being placed at a location with respect to the platform such that motion of the folding paddle toward the center of the platform folds a portion of the wrap. The holding arm has a tip at a free end thereof, being movable in a vertical direction toward and away from the center of the platform. The holding arm is configured to contact the wrap and hold the folded pleat in place while the food pocket rotates with respect to the platform to permit the folding paddle to generate a successive pleat.

20 Claims, 11 Drawing Sheets

(56) References Cited

U.S. PATENT DOCUMENTS

2015/0128817 A1 5/2015 Berger et al.
2017/0347668 A1* 12/2017 Shtilerman .......... A21C 1/1445

* cited by examiner

APPARATUS AND METHOD FOR MAKING SANDWICH

BACKGROUND

Aspects of the present disclosure relate to apparatuses and techniques that may be used to automatically make a pocket sandwich. More specifically, the subject apparatus and method disclose an automated means to form a sandwich from a tortilla, pita bread, or other wrap so as to contain selected food ingredients.

Pocket sandwiches are sandwiches made by using a single piece of folded or hallowed bread, such as pita, tortilla, or other wrap with fillings contained inside the bread. For example, tortilla sandwiches are made of a flour tortilla that is folded to include various other food ingredients and are popular worldwide. Generally, such sandwiches are manually made by putting an appropriate amount of food ingredients at a location on an unfolded tortilla and folding the tortilla in a desired configuration to enclose the food ingredients. However, making a pocket sandwich is not a simple or fun process, particularly where heat is applied to seal the food ingredients within the pocket.

No compact or automatic pocket sandwich makers are known in the market. Currently-available wrap makers are either too bulky and/or complex or need extensive manual interventions. These bulky and/or complex wrap makers are provided for commercial use and are generally not suitable for individual use. Wrap makers with manual interventions may be unsanitary and/or messy in making wraps. A wrap may also not be toasted as would be commonly done with a pocket sandwich.

In view of the foregoing reasons, it would be desirable to have a compact size apparatus for automatically making pocket sandwiches with limited manual interaction. Further such an apparatus would not have undue complexity, would be suitable for personal use, would not be unsanitary, or some combination of the above.

SUMMARY OF THE DISCLOSURE

An embodiment of the present disclosure comprises an apparatus for making a pocket sandwich with a platform having a surface configured to support a wrap, such as a tortilla, pita bread, or the like. A food pocket is arranged at a center of the platform is rotatable with respect to the platform. The food pocket rotates about an axis arranged generally perpendicular to the surface of the platform.

A folding paddle is hingedly mounted to the platform such that the folding paddle is configured to rotate toward and away from the center of the platform. The folding paddle is placed at a location with respect to the platform such that motion of the folding paddle toward the center of the platform folds a portion of the wrap on itself so as to generate a folded pleat.

A holding arm comprises an arm body with a tip at the free end thereof. The tip and at least a portion of the arm body are disposed above the surface of the platform. The tip is movable in at least a vertical direction toward and away from the center of the platform. The holding arm is configured to contact the wrap and hold the folded pleat in place while the food pocket rotates a predetermined angle with respect to the platform to permit the folding paddle to generate a successive folded pleat in the wrap.

In still further detail, a motor is provided to drive the rotation of the food pocket. The motor is configured to rotate the food pocket in fixed increments, such as 60 degrees. A pedestal supports the platform, the food pocket, the folding paddle, and the holding arm, and a lid is hingedly attached to the pedestal. Further, a first heating element may be contained within the pedestal and proximate the food pocket. Also, a second heating element could be contained within or otherwise in contact with the lid.

A method for making a pocket sandwich with a wrap and food ingredients is also disclosed herein wherein a platform has a surface configured to support a wrap and a food pocket arranged at a center of the platform. The food pocket is rotated with respect to the platform about an axis arranged generally perpendicular to the surface of the platform. The method comprises folding the wrap from one direction with a folding paddle hingedly connected to the platform to generate a pleat in the wrap. The pleat is held by a holding arm. Another step comprises rotating the food pocket and the wrap by a predetermined angle while the folded pleat is held by the holding arm. The assembly steps are repeated until a predetermined number of pleats are completed.

BRIEF DESCRIPTION OF ACCOMPANYING DRAWINGS

The following detailed description of preferred embodiments of the disclosure will be better understood when read in conjunction with the appended drawings. For the purpose of illustration, there are shown in the drawings embodiments which are presently preferred. It should be understood, however, that the invention disclosed herein is not limited to the precise arrangements and instrumentalities shown.

Figure 1:
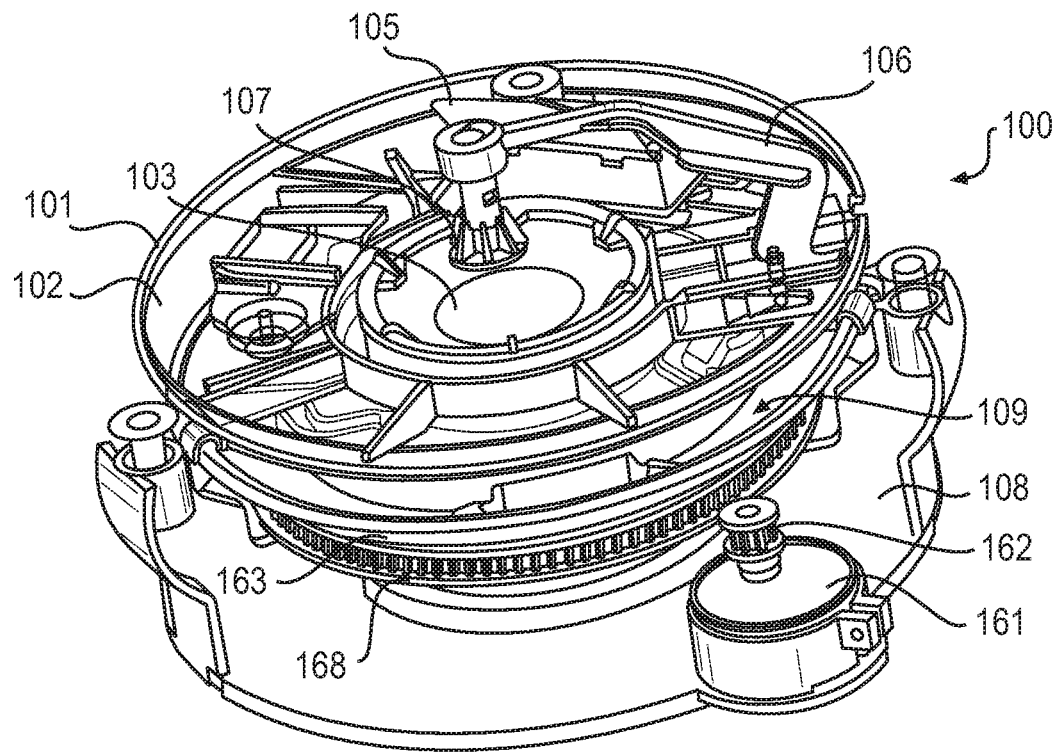
FIG. 1 is a perspective, partially transparent view of a pedestal portion of an apparatus for making a pocket sandwich in accordance with preferred embodiment of the present invention.

It should be further noted that the figures are not drawn to scale and that elements of familiar structures or functions are generally represented by like reference numerals for illustrative purpose throughout the figures. It also should be noted that the figures are only intended to facilitate the description of the various aspects of this disclosure, and therefore, do not illustrate every aspect of this disclosure and do not limit the scope of this disclosure.

DETAILED DESCRIPTION OF ASPECTS OF THE DISCLOSURE

Certain terminology is used in the following description for convenience only and is not limiting. The words "right", "left", "lower", and "upper" designate directions in the drawings to which reference is made. The words "inwardly" and "outwardly" refer to directions toward and away from, respectively, the geometric center of the apparatus and designated parts thereof. The terminology includes the above-listed words, derivatives thereof, and words of similar import. Additionally, the words "a" and "an", as used in the claims and in the corresponding portions of the specification, mean "at least one."

Figure 2:
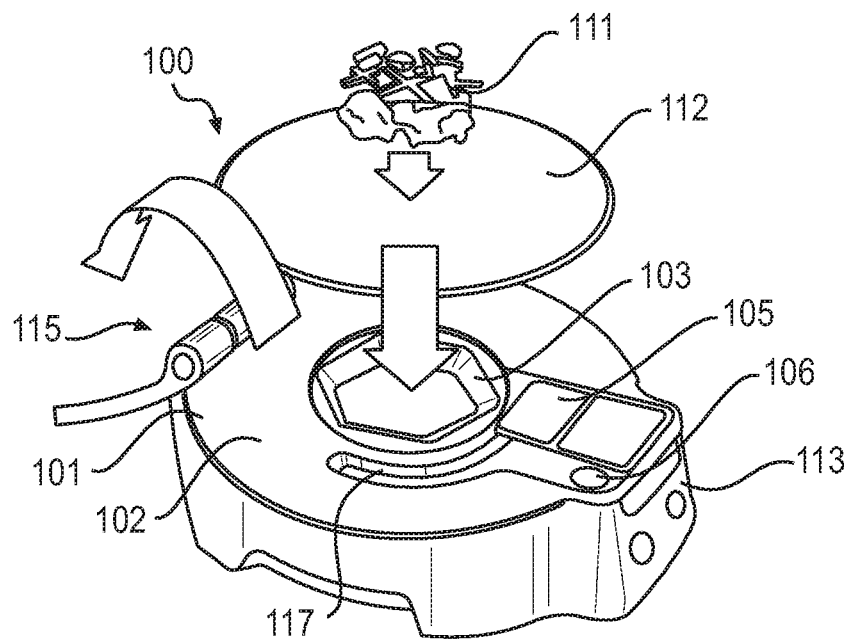
FIG. 2 is a conceptual schematic diagram of the apparatus of FIG. 1 during placement of the wrap.

Referring to FIGS. 1 and 2, a pocket sandwich maker 100 may include a folding paddle 105, a holding arm 106, and a platform 101, which together are part of a sandwich forming mechanism. In FIG. 1, the sandwich maker 100 may further be provided with a pedestal 108 for supporting the sandwich forming mechanism 109 of the sandwich maker 100. The pedestal 108 may be made of a metal material, a plastic material, or like food-safe materials. The sandwich forming mechanism 109 may include, in addition to the folding paddle 105, the holding arm 106, and the wrap platform 101, other components to control and operate the sandwich maker 100.

The wrap platform 101 of sandwich maker 100 may be provided for supporting a food load, e.g., a wrap 112 (FIG. 2). Wrap 112 can comprise a foldable, edible item operable to contain further ingredients therein. The wrap platform 101 preferably includes a circular flat surface 102 and a recessed food pocket 103 located generally within the center of the circular flat surface 102. The recessed food pocket 103 may be used to hold the wrap 112 while selected food ingredients 111 are placed on top of the wrap 112, preferably a portion of the wrap 112 that overlies the recessed food pocket 103.

The folding paddle 105 may be placed at a selected position of the platform 101 for folding the wrap 112. The folding paddle 105 may form part of the circular flat surface 102 when not actuated, so as to avoid interfering with the wrap 112 during rotation thereof, as explained in further detail below.

The holding arm 106 may be associated with the platform 101 and be configured to cooperate with the folding paddle 105. The holding arm 106 preferably has at least two positions, a retracted position and a holding position. In the retracted position, the holding arm 106 does not contact the wrap 112. In the holding position, the holding arm 106 preferably contacts the wrap 112 to maintain a folded pleat. The holding arm 106 may include a rotating tip 107 at an end thereof, which may be positioned coaxially with the recessed food pocket 103, at least in the holding position. When the wrap 112 is in contact with the holding arm 106, the rotating tip 107 may rotate with the wrap 112 to avoid loosening a previously completed fold of the wrap 112. Additional detail regarding the holding arm 106 will be provided with reference to FIG. 4.

In use, a wrap 112 may be placed on the platform 101 when the folding paddle 105 lies flat along the circular flat surface 102 and the folding arm 106 is in the retracted position. Selected food ingredients 111 may be added on the wrap 112, which overlies and may at least partially sink into the recessed food pocket 103. The folding paddle 105 folds the wrap 112 to make a pleat, and the holding arm 106 preferably holds the pleat in place while the folding paddle 105 creates a successive pleat. The wrap 112 may rotate, as a result of at least one of rotation of the platform 101 or the recessed food pocket 103, by a predetermined angle, for example by sixty degrees, while the holding arm 106 holds the pleat.

Although the sandwich maker 100 is shown and described herein as rotating the recessed food pocket 103 to allow the folding paddle 105 to make successive pleats in the wrap 112, alternatively the recessed food pocket 103 may be held in position while the folding paddle 105 is moved to different locations with respect to the circular flat surface 102 to make the pleats in the wrap 112.

The sandwich maker 100 preferably includes an electrical motor 161, e.g., a line voltage (120V) motor of approximately four watts, for providing driving power to the sandwich forming mechanism 109 of the sandwich maker 100, such as enabling relative rotation of the wrap 112. The electrical motor 161 outputs rotation to a motor pinion 162, which preferably drives a corresponding driven gear 168 of a drive plate 163 by a tooth belt or one or more gears (not shown). The drive plate 163 may have a circular shape and be associated with the recessed food pocket 103, the folding paddle 105 and/or the holding arm 106 via additional driving mechanisms for folding and/or holding pleats of the wrap 112 (not shown in FIG. 1) loaded on the platform 101. Additional detail regarding the power driving mechanisms will be provided below with reference to FIGS. 6-16.

Although shown and described as using the pinion 162, gears and/or the toothed belt for purposes of illustration only, any suitable types of driving mechanisms may be used for power transmission from the motor 161 of the sandwich maker 100.

The sandwich maker 100 preferably automatically makes pocket sandwiches with uniform pleats and is simple in structure and compact in size. The sandwich maker 100 is further cost effective and simple to operate for an ordinary family's kitchen to make their custom flavored sandwiches.

FIG. 2 shows the exemplary sandwich maker 100 being loaded with a tortilla wrap 112. The recessed food pocket 103 is preferably rotatable with respect to the circular flat surface 102 in order to rotate the wrap 112 for sequenced folding by the folding paddle 105. When the wrap 112 is loaded onto the platform 101, the wrap 112 may have contact with the circular flat surface 102, which may make it difficult to rotate the wrap 112, with a rotation of the recessed food pocket 103, due to a friction between the wrap 112 and the circular flat surface 102.

In order to reduce or eliminate the above-described friction, the recessed food pocket 103 may be at least partially recessed below the circular flat surface 102, and allow for loading of the selected food ingredients 111 on the wrap 112 at a position and area corresponding to the recessed food pocket 103. In other words, the recessed food pocket 103 preferably provides a target loading zone for the selected food ingredients 111. When selected food ingredients 111 are loaded at the target loading zone of the wrap 112, pressure is applied to the center portion of the wrap 112, which causes the center portion to collapse into the recessed food pocket 103. Because of the recess of the wrap 112, grip by the recessed food pocket 103 may be enhanced and the friction between the circular flat surface 102 and the wrap 112 may be reduced or eliminated for easy rotation of the wrap 112 by the recessed food pocket 103. In addition, a height of the food ingredients 111 being enclosed by the wrap 112 may be reduced for more convenient handling of the wrap 112.

The recess of the recessed food pocket 103 may have a polygon shape, e.g., a triangle, a quadrilateral, a pentagon, a hexagon, a heptagon, an octagon, or the like. The polygonal shape further improves the grip by the recessed food pocket 103 on the wrap 112 for rotation.

As described above, the holding arm 106 is preferably provided to hold completed pleats when the folding paddle 105 retracts and the wrap 112 is rotated. The holding arm 106 may move along with rotation of the wrap 112 to prevent an unwanted relative motion between the holding arm 106 and the wrap 112. The movement of the holding arm 106 may be guided and/or restricted by a guide slot 117 arranged on the circular flat surface 102. Additional detail regarding the holding arm 106 is provided below.

In some embodiments of this disclosure, the sandwich maker 100 may include a heating lid 115 that may be hingedly attached to the platform 101. The heating lid 115 is preferably in an open position when the wrap 112 is being folded and preferably in a closed position when folding of the wrap 112 is completed. While in the closed position, the heating lid 115 may be used to heat the folded wrap 112, such as a tortilla, crepe or the like, to a selected temperature.

The sandwich maker 100 may further include a control panel 113 for controlling operation of the sandwich maker 100 and for displaying status related operational information to the user. For example, a user may set a temperature and start the operation of the sandwich maker 100 at a desired time, and/or monitor the temperature and/or stop the operation at any desired time.

Figure 3:
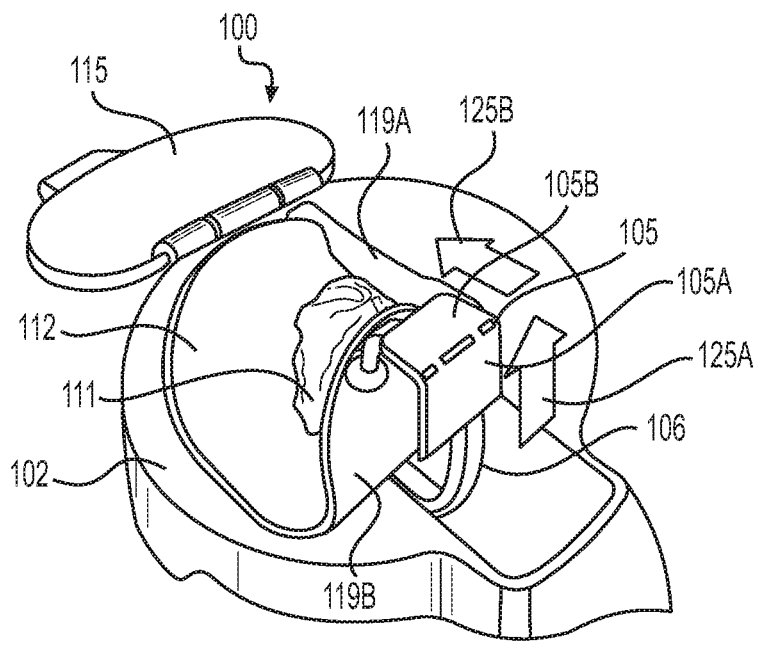
FIG. 3 is a conceptual schematic diagram of the apparatus of FIG. 1 during folding of the wrap.

Referring to FIG. 3, the folding paddle 105 may lie flat along the circular flat surface 102 when the folding paddle 105 is not activated, but is preferably movable to fold the wrap 112 to form pleats. In FIG. 3, a first pleat 119A is shown as having been previously formed by the folding paddle 105, and the wrap 112 been rotated to a successive position for folding a successive pleat 119B.

The folding paddle 105 may include at least a lower paddle 105A and an upper paddle 105B, which may be hingedly connected to one another and to the circular flat surface 102 or other portion of the sandwich maker 100. In an inactivated position, both the lower paddle 105A and the upper paddle 105B may lie in a plane of the circular flat surface 102. To make the fold, the lower paddle 105A is preferably rotated away from the circular flat surface 102 in a first direction 125A to a position that is substantially perpendicular to the circular flat surface 102. A portion of the wrap 112 preferably overlies the lower paddle 150A such that motion of the lower paddle 105A causes a fold of the wrap 112. The upper paddle 105B is also rotated in a second direction 125B toward a position that is substantially parallel to the circular flat surface 102 and substantially perpendicular to the lower paddle 105A. Accordingly, an edge of the folded portion of the wrap 112 may be folded towards the center of the wrap 112, forming the second pleat 119B that may subsequently be held in place by the holding arm 106. Although shown and described as using one folding paddle 105 for purposes of illustration only, multiple folding paddles 105 may be employed to make pleats, e.g., two, three, four, five, six folding paddles, or the like.

Figure 4A:
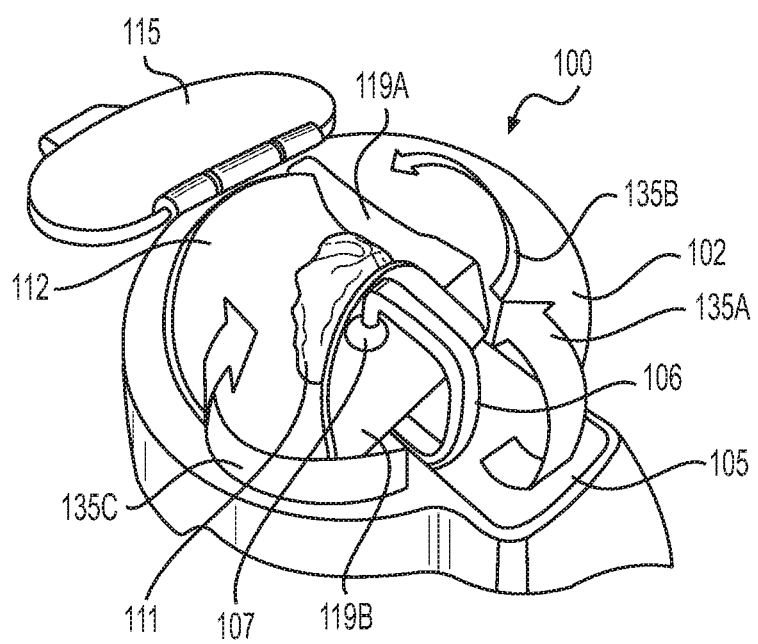
FIGS. 4A-4C are conceptual schematic diagrams of the apparatus of FIG. 1 during rotation of the wrap.

FIG. 4A shows the holding arm 106 depressing two completed folded pleats 119A, 119B that have been made for enclosing food ingredients 111. As shown and described, when not activated, the holding arm 106 may be retracted to an open position (shown in FIG. 4B) that does not interfere with a rotation of the wrap 112, or to a storage position (shown in FIG. 4C) that does not interfere with the heating lid 115 (FIG. 5). When a pleat, e.g., a second pleat 119B, has been formed, the holding arm 106 may rotate in a holding direction 135A from a retracted position to contact the folded pleat using the rotating tip 107. The rotating tip 107 keeps the pleat 119B closed as the wrap 112 is rotated to the next position for a folding paddle 105 to form a subsequent interlocking pleat (not shown).

Wrap 112 may be rotated in either direction such as the counterclockwise direction 135B to the next position to allow the folding paddle 105 to generate the successive interlocking pleats. The holding arm 106 is preferably designed to avoid any relative motion between the holding arm 106 and the wrap 112 while the wrap 112 is being rotated because such relative motion may cause an unwanted spin of the wrap 112 relative to the recessed food pocket 103 (FIG. 2). Relative spin between the wrap 112 and food pocket 103 may loosen previously completed pleats.

In some embodiments, the holding arm 106 and/or rotating tip 107 may rotate along with the rotation of the wrap 112. Rotating the rotating tip 107 with the wrap 112 reduces or eliminates any relative motion between the wrap 112 and the rotating tip 107. In some further embodiments, the holding arm 106 may hold and move along with the wrap 112 while the wrap 112 rotates in the counterclockwise direction 135B. The holding arm 106 may start from a first position (not shown) and move to a finished position (as shown in FIG. 4A). The first position may be thirty to sixty degrees to a clockwise direction of the finish position. Before the wrap 112 is rotated, the holding arm 106 may move in the clockwise direction 135C to the first position to allow the folding paddle 105 to make the successive pleat, and then move along with the wrap 112 as the wrap 112 rotates in the anticlockwise direction 135B.

Folding of the wrap 112 by the folding paddle 105, holding the successively created pleats of the wrap 112 by the holding arm 106, and rotation of the wrap 112 to successive pleat positions by, for example, the recessed food pocket 103, may repeat until a final pleat (not shown) is formed and the held in place by the folding paddle 105. The heating lid 115 may subsequently be closed, either automatically or manually, while the folding paddle 105 is holding the last pleat.

Figure 4B:
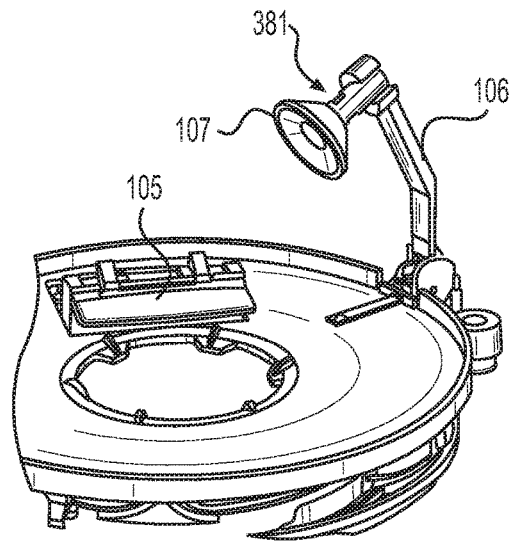
Figure 5:
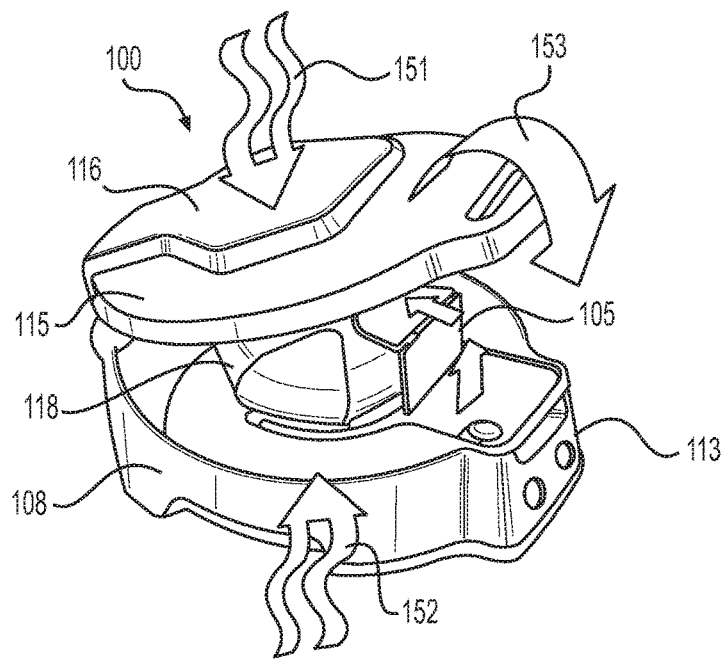
FIG. 5 is a conceptual schematic diagram of the apparatus of FIG. 1 during heating of the folded wrap.

FIG. 4B shows the holding arm 106 in a retracted position. As shown and described, when not activated, the holding arm 106 may be retracted to an open position 381 for the folding paddle 105 to generate a successive interlocking pleat. When the holding arm 106 is retracted to the open position 381, the holding arm 106 may be lifted up and away from the wrap 112 (FIG. 4A), and the rotating tip 107 may be lifted from a contacting position with the wrap 112. The holding arm 106 may start to retract when the folding paddle 105 is generating an interlocking pleat to the wrap 112 and may cooperate with the folding paddle 105, such that the holding arm 106 starts to retract when the folding paddle 105 holds or is about to hold previously completed pleats.

The holding arm 106 may be activated to be lowered to hold a completed pleat of the wrap 112 when the folding paddle 105 completes the pleat and the wrap 112 is ready for being turned by a predetermined angle for initiating a successive pleat.

Figure 4C:
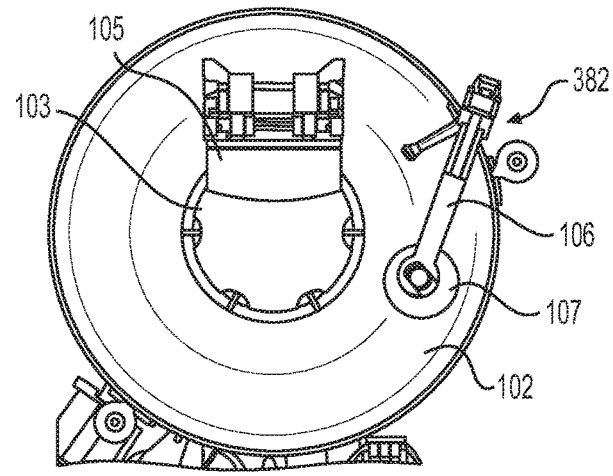

FIG. 4C shows the holding arm 106 in a storage position 382. As shown and described, when not activated, the holding arm 106 may be retracted to the storage position 382 for closing the heating lid 115 (FIG. 5) and/or for a user to load a wrap 112 (FIG. 4A) with selected ingredients into the recessed food pocket 103. When a predetermined number of pleats of the wrap 112 have been completely generated, the holding arm 106 may be snapped out of the activated position and into the storage position 382.

To get to the storage position 382, the free end of the holding arm 106 may be rotated toward an edge of the circular flat surface 102, and the rotating tip 107 may optionally be either in contact or not in contact with the circular flat surface 102. For example, the holding arm 106 may be pivoted counter-clockwise by about thirty-five degrees to a position that neither interferes with closing of the heating lid 115, nor interferes with loading of the wrap 112 and the selected ingredients into the recessed food pocket 103.

Although shown and described as swinging toward the edge of the circular flat surface 102 for a purpose of illustration only, the holding arm may be stored in any position that does not interfere the closing of the heating lid 115 or the loading of the wrap 112 and/or the ingredients into the recessed food pocket 103.

FIG. 5 shows the heating lid 115 partially displaced towards the closed position. At this point, the wrap 112 has been folded to have a predetermined number of pleats and the food ingredients 111 have been contained therein to form the pocket sandwich 118. The folding paddle 105 preferably stays in place to hold the sandwich 118 closed by holding the last pleat of the sandwich 118.

The heating lid 115 may be closed, either manually or automatically, in a direction 153 to make contact with an upper portion of the sandwich 118. The heating lid 115 may include a concaved portion 116 generally positioned to receive the upper portion of the sandwich 118. The concaved portion 116 preferably allows a reduction in a height of the sandwich 118 and/or an increase in the contact surface area between the heating lid 115 and the sandwich 118.

Heating elements (not shown) may be included in a pedestal 108 of the sandwich maker 100 and/or the heating lid 115 for heating the sandwich 118. The placement of and types of heating elements can vary as suitable. The heating element(s) preferably provide heat energy 151, 152 from the heating lid 115 and/or the pedestal 108 for heating the sandwich 118. The application of heat also can create a seal or otherwise join wrap 112 unto itself such that the sandwich 118 remains folded without the application of external force.

The control panel 113 may be used to set heating parameters, such as a temperature and/or a time duration of the heating process. Additionally, the control panel 113 may display a status of the heating process, e.g., a measured temperature and/or real time or the like for a user to decide a readiness of the sandwich 118. When the sandwich 118 is satisfactorily heated, the heating process may be stopped, and the heating lid 115 may be opened. The folding paddle 105 may be released for serving the heated sandwich 118.

Figure 6:
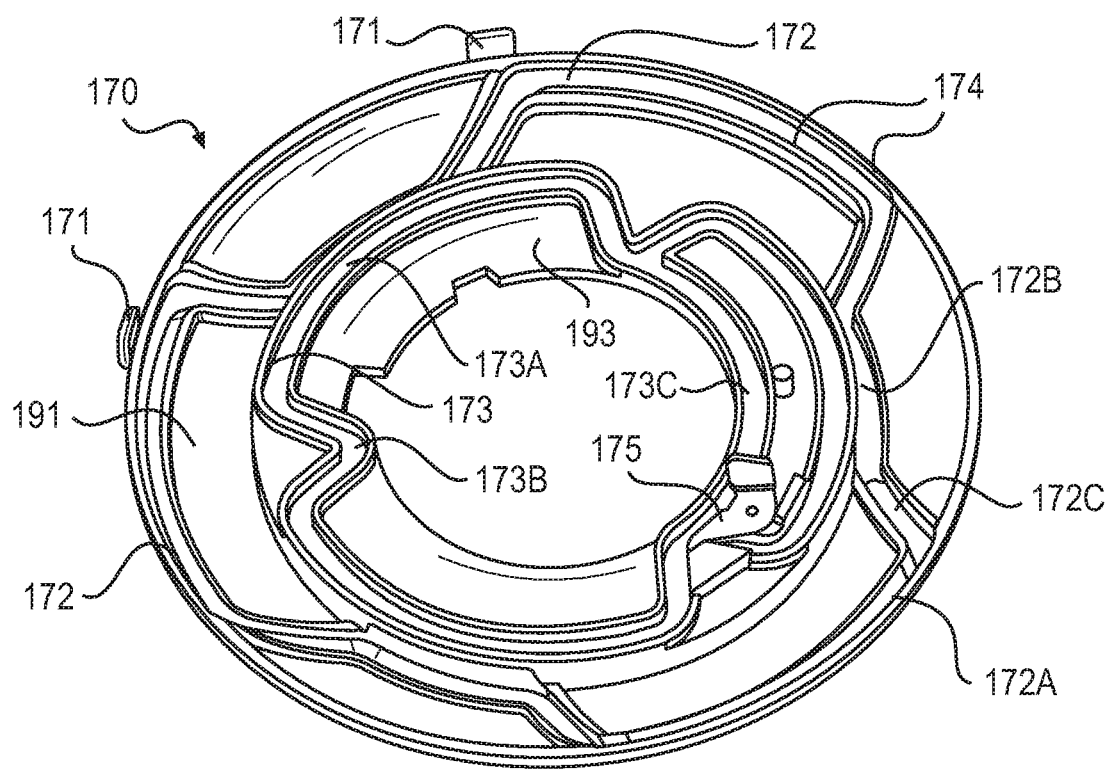
FIG. 6 is a perspective view of a cam ring for use in the apparatus of FIG. 1.
Figure 14:
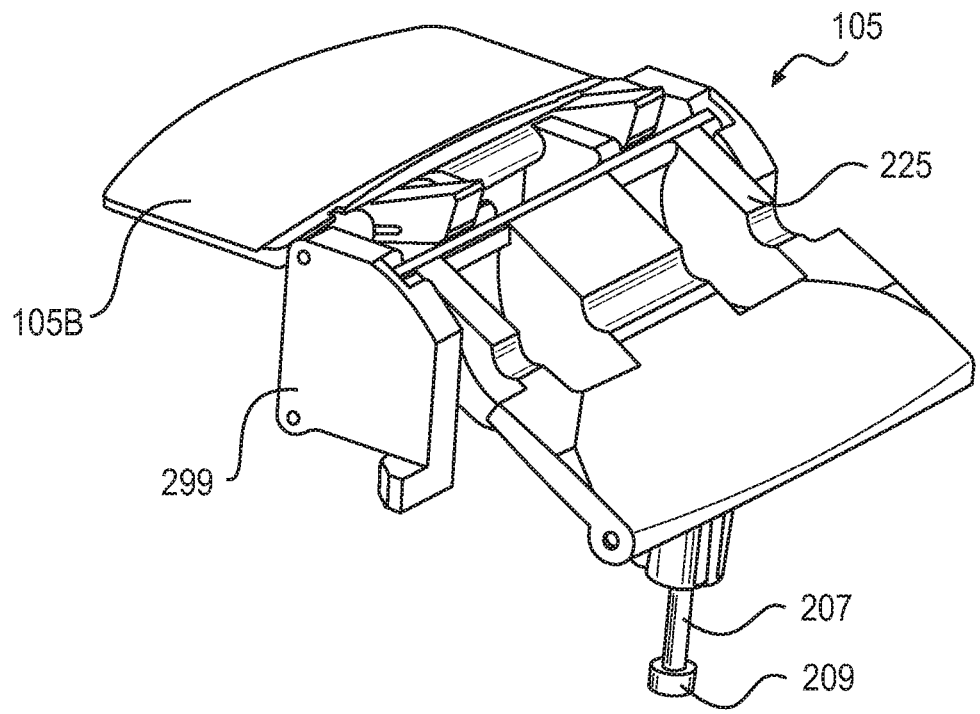
FIG. 14 is a perspective view of a folding paddle for use with the apparatus of FIG. 1.
Figure 15:
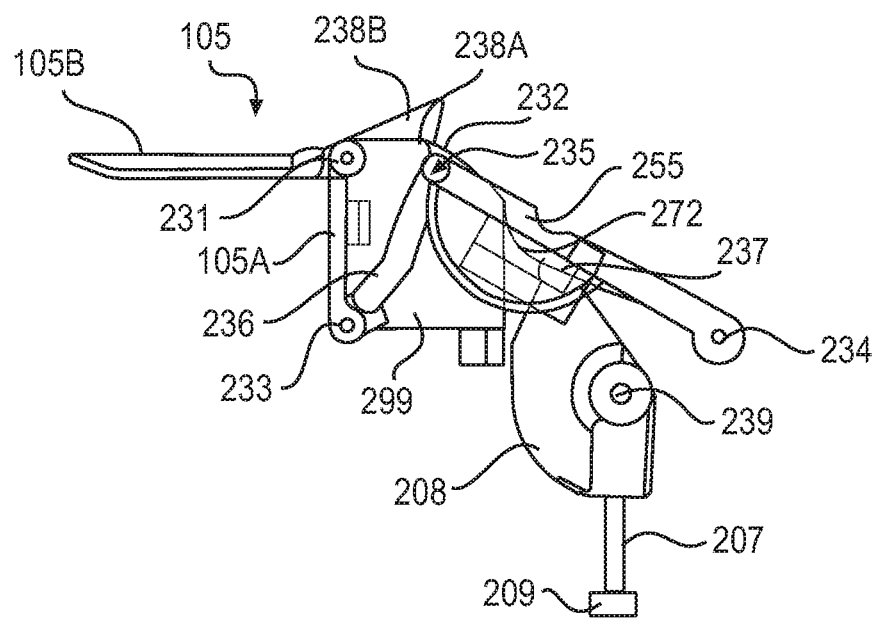
FIG. 15 is a side elevational view of the folding paddle of FIG. 14.

FIG. 6 illustrates an exemplary cam ring 170 for use with the sandwich maker 100. The cam ring 170 preferably includes at least two cam tracks, an outer cam track 172 and an inner cam track 173, for cooperating with different rollers (FIGS. 12-15). The cam ring 170 is preferably an annular shaped plate having an outer partially spherically shaped surface 191 and an inner flat section 193. Ribs 174 are attached or formed on the cam ring 170 to define the outer cam track 172 and/or the inner cam track 173. The outer cam track 172 may include outer sections 172A, inner sections 172B, and transitional sections 172C for guiding a follower roller 209 that may control operation of the folding paddle 105 (FIGS. 14-15). Accordingly, the outer cam track 172 may form continuous three sectioned patterns each circumferentially occupying one hundred and twenty degrees (120°) of the cam ring 170. Thus, the outer cam track 172 may have a curved profile to guide the pivoting actuation of the folding paddle 105.

Figure 13:
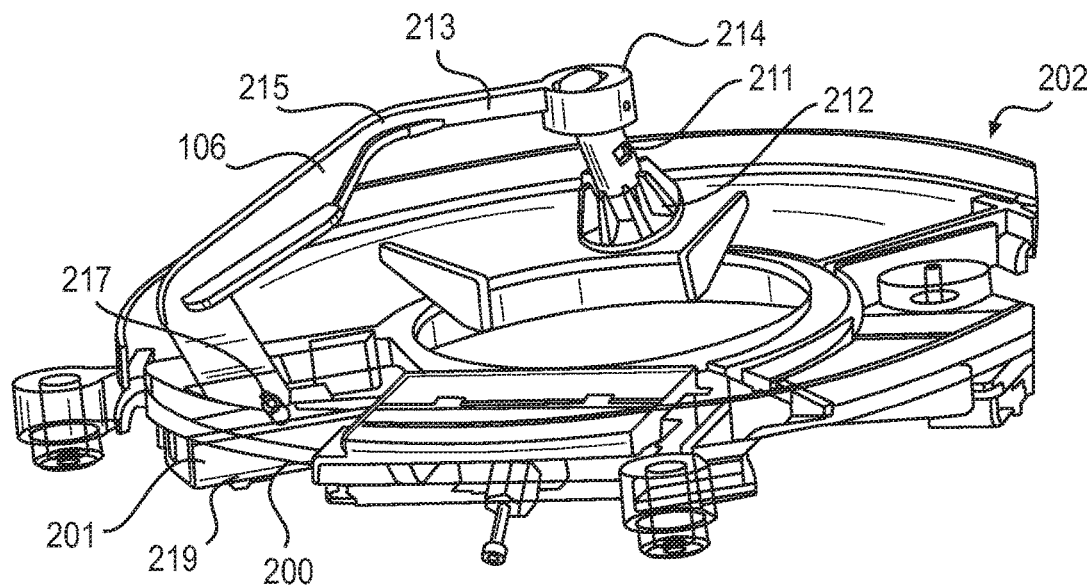
FIG. 13 is a perspective top side, partially transparent view of the platform assembly of FIG. 12.

The inner cam track 173 may include convex sections 173A and concaved sections 173B for guiding a follower roller 204 that may control operation of the holding arm 106 (FIG. 13). The inner cam track 173 may be arranged on a relatively flat surface of the cam ring 170, thus, the inner cam track 173 may have a flat profile to guide the reciprocating actuator of the holding arm 106.

The cam ring 170 may be provided with one or more stop switch tabs 171 defining stop positions of the driving motor 161 (FIG. 1). The stop switch tabs 171 may cooperate with bulges 255 arranged on an indexer collar 176 in order to trigger a stop switch 258 (collectively shown in FIG. 16) for stopping a folding cycle. The cooperation between the stop switch tabs 171 and the bulges 255 preferably ensures that the cam ring 170 rotates two full cycles in each folding process, and the indexer collar 176 rotates only one full cycle in each folding process.

The cam ring 170 may include a track switch lever 175 that may be spring loaded. The track switch lever 175 may divert the roller 204 of the holding arm 106 at an appropriate interval. For example, the track switch lever 175 may be configured to divert the roller 204 to an inner circular section 173C for keeping the holding arm 106 in the retracted position. Additional detail regarding the operations of the folding paddle 105 and the holding arm 106 will be provided below with reference to FIGS. 13-14. Although shown and described as using cam tracks 172, 173 and follower rollers 204, 209 for purposes of illustration only, the folding paddle 105 and the holding arm 106 may be guided and/or operated via any suitable means.

Figure 7:
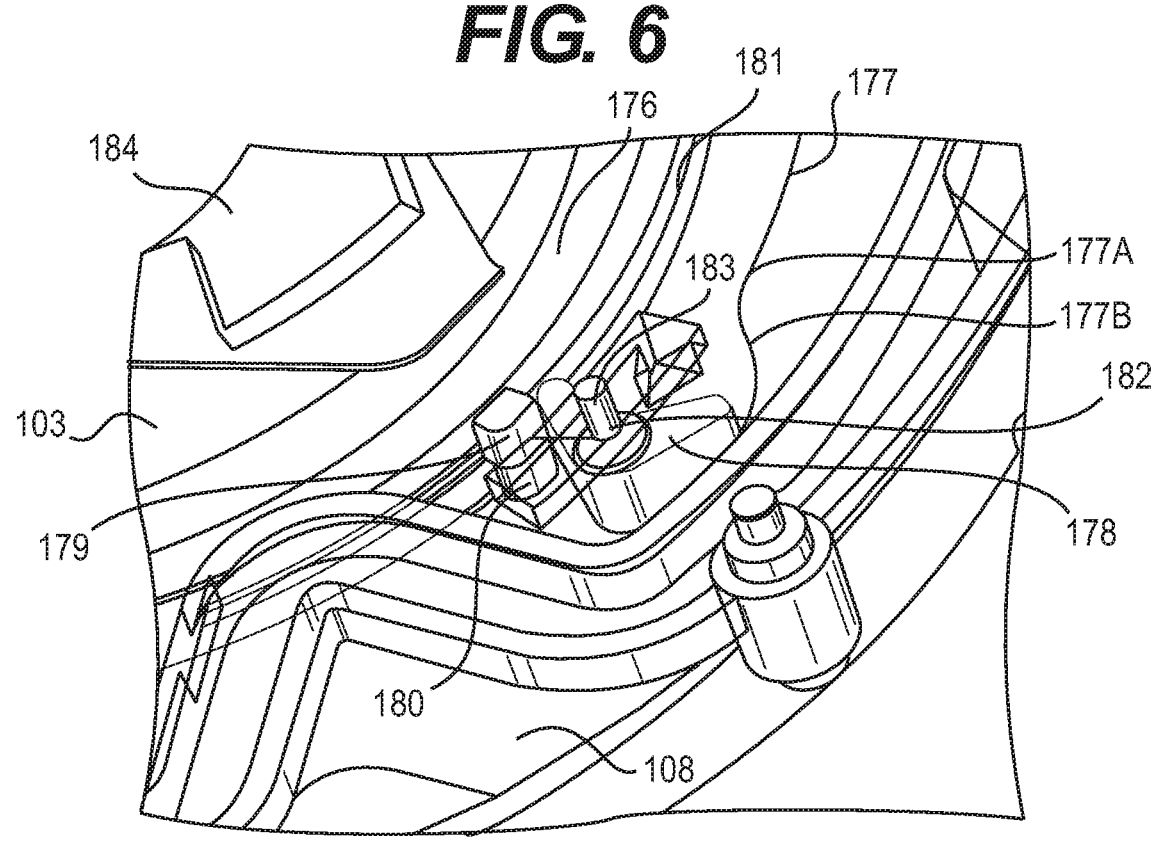
FIG. 7 is an enlarged perspective, partially transparent view of a portion of the apparatus of FIG. 1.

FIG. 7 shows a perspective view of a section of the cam ring 170. The indexer collar 176 may be provided for intermittently rotating the recessed food pocket 103 and, thus, rotating the wrap 112 for sequential folding. The indexer collar 176 may be moveable or rotatable around a vertical axis (not shown) of the sandwich maker 100. Multiple tabs 179, e.g., six tabs, may be attached to the indexer collar 176. Each of the tabs 179 may be alternately pushed tangentially in a clockwise direction by one of a plurality of indexer pawls 178, e.g., three. The indexer pawls 178 may each be coupled to the cam ring 170 via a pivot pin 183 mounted to an underside of the cam ring 170 so as to be movable along with the cam ring 170. Each of the indexer pawls 178 may be driven and/or rotatable about the pivot pin 183.

Each of the indexer pawls 178 may drive the indexer collar 176 to intermittently rotate by a predetermined angle, e.g., approximately sixty degrees. To accomplish this purpose, the indexer pawls 178 may, when being moved along with the cam ring 170, contact and follow a rigid rib profile 177 that is arranged on a portion of a pedestal 108. The rib profile 177 includes an engagement section 177A and a release section 177B. The indexer pawl 178 may be spring-loaded for providing a force against the rib profile 177. The indexer pawl 178 is confined by and, thus, not rotatable in the engagement section 177A, and be at least partially released for a partial rotation in the release section 177B.

Figure 11:
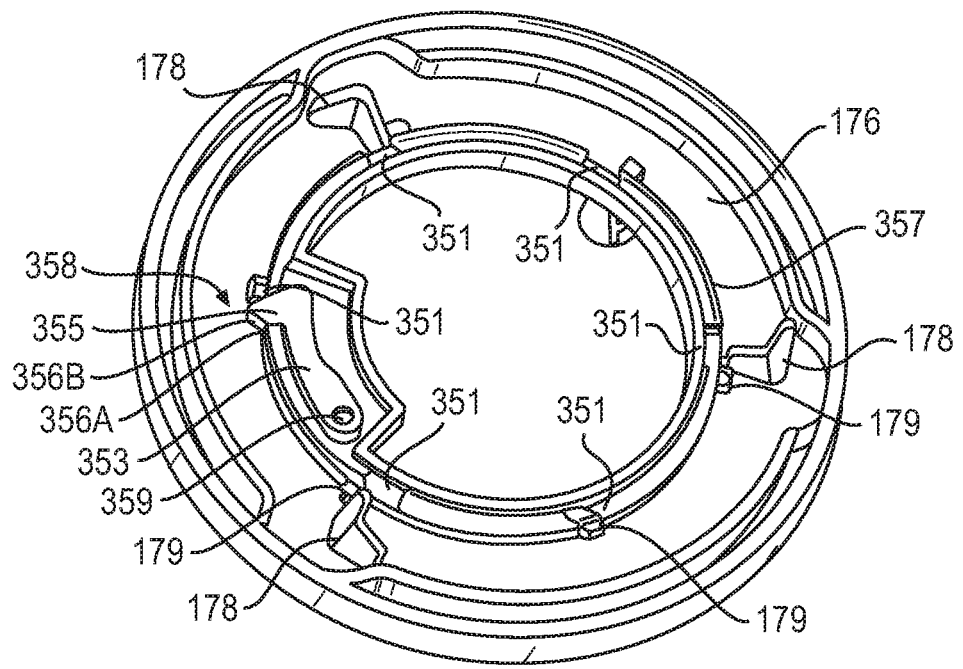
FIG. 11 is a bottom side perspective view of the indexer collar of FIG. 8.

In operation, the indexer pawl 178 moves with a rotation of the cam ring 170, into the engagement section 177A and contacts a tab 179. The indexer pawl 178 pushes the tab 179 and, thus, rotates the indexer collar 176. When the indexer pawl 178 moves into the release section 177B, the indexer pawl 178 spins to release the tab 179 and the indexer collar 176. The engagement section 177A and the release section 177B are configured to allow the indexer collar 176 to intermittently rotate through a predetermined angle for the folding paddle 105 and the holding arm 106 to operate in predetermined patterns. An optional brake element 184 may be provided to ensure that indexer collar 176 is not dragged because of a contact between the cam ring 170 and the indexer collar 176 when the indexer collar 176 should be kept stationary. Although shown and described as using the brake element 184 for purposes of illustration only, any other means for ensuring the indexer collar 176 is not dragged may be used, for example a lock lever 353 (FIG. 11).

In some embodiments, a plurality of fixed tabs 180, e.g., three fixed tabs, may be mounted to a stationary element, such as the bottom housing 169 (FIG. 9) for assisting the spin of the indexer pawl 178 and ensuring the predetermined rotation angle of the indexer collar 176. The fixed tabs 180 may be arranged in a manner such that the indexer collar 176 may be stopped when the tab 179 being pushed is aligned with one of the fixed tabs 180. When spun in the release section 177B, the indexer pawl 178 may pass around the tab 179 and the fixed tab 180 for releasing the indexer collar 176.

Figure 8:
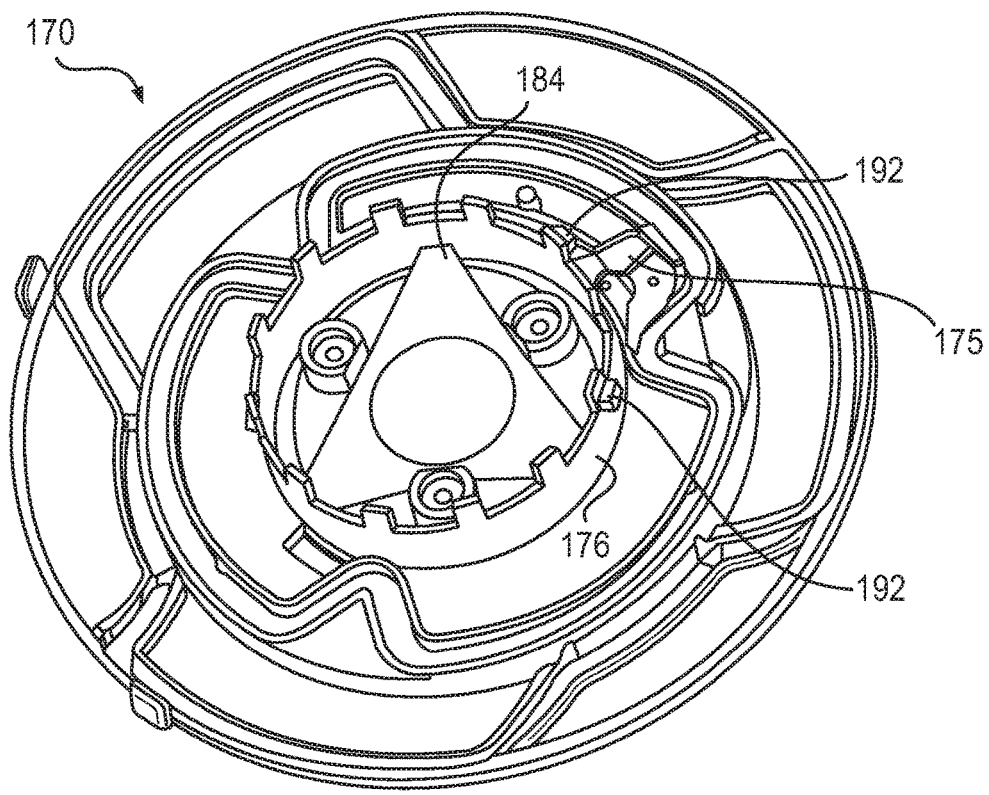
FIG. 8 is a perspective view of the cam ring of FIG. 6 assembled together with an indexer collar.

FIG. 8 illustrates a top view of the exemplary cam ring 170 and indexer collar 176 assembled together. The indexer collar 176 may be provided with two actuator tabs 192 that may be attached to or formed on the indexer collar 176, e.g., at an outer surface of the indexer collar 176. During relative rotation of the cam ring 170 and the indexer collar 176, the actuator tabs 192 preferably move to engage the spring-loaded switch lever 175 mounted to the platform 101 in order to cause rotation of the switch lever 175. Additional detail regarding the spring-loaded switch lever 175 will be provided herein.

Figure 9:
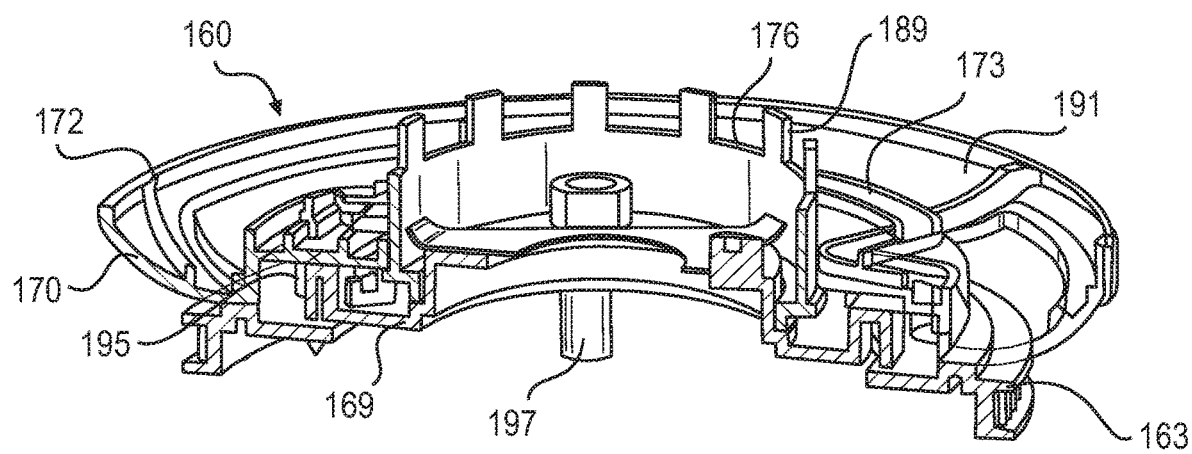
FIG. 9 is a perspective cross-sectional, partially transparent view of various components in the pedestal portion of the apparatus of FIG. 1.
Figure 10:
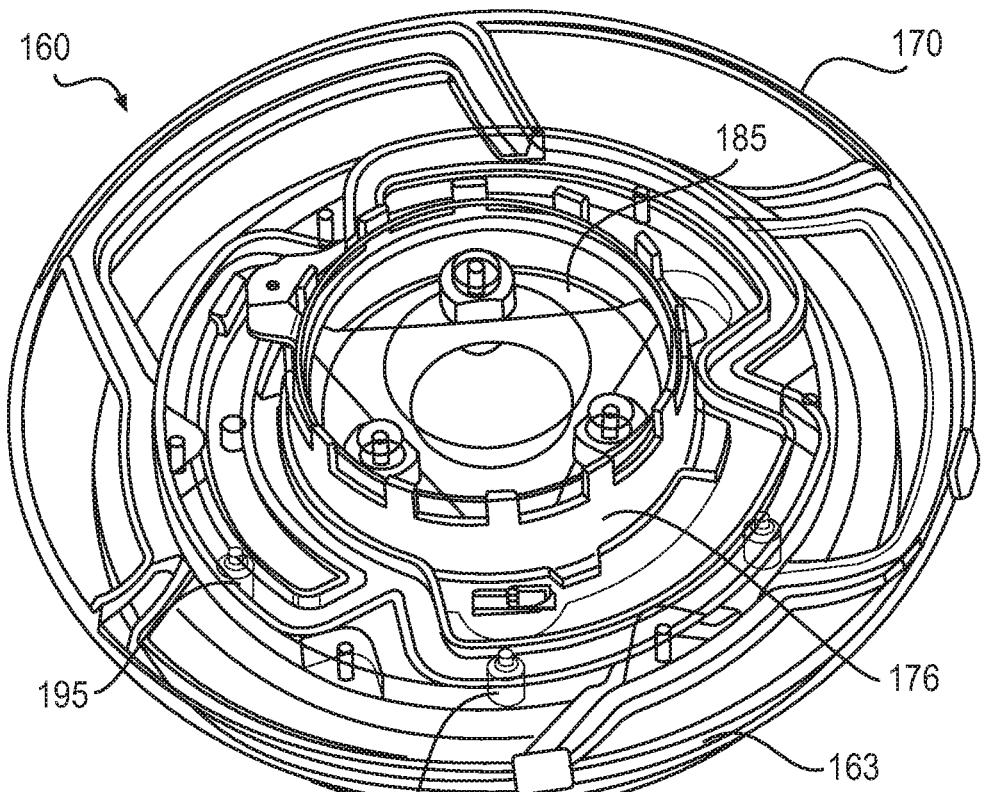
FIG. 10 is a perspective, partially transparent view of various components in the pedestal portion of the apparatus of FIG. 1.

FIGS. 9 and 10 show a drive pack assembly 160, which is preferably attached to the drive plate 163. The drive plate 163 may be fixedly coupled with and, thus, drive the cam ring 170, via coupling pins (not shown). The drive plate 163 and the associated cam ring 170 may be supported via multiple rollers 195, e.g., six rollers, which are rotatably coupled to the drive plate 163 and/or the cam ring 170, to provide free rotation with minimal friction with a stationary bottom housing 169.

Figure 16:
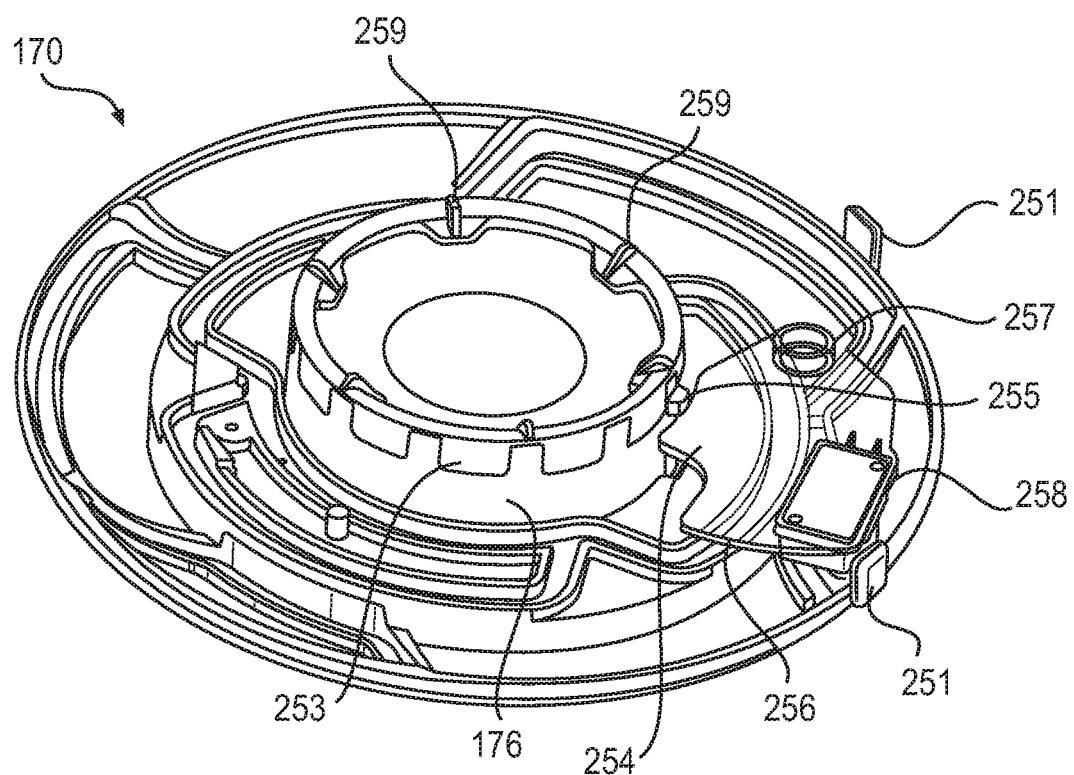
FIG. 16 is a perspective, partially transparent view of various components in the pedestal portion of the apparatus of FIG. 1.

The indexer collar 176 may be associated with the cam ring 170 and/or the drive plate 163 for being intermittently rotated as described above. The indexer collar 176 preferably includes one or more teeth 189 extending substantially parallel to a vertical axis for receiving and/or driving a recessed food pocket 103 (FIG. 1) and/or a grip ring 253 (FIG. 16).

A bottom housing 169 may be arranged as a stationary component with respect to the drive plate 163, the cam ring 170 and/or the indexer collar 176. The bottom housing 169 may be enclosed by the drive plate 163 and/or the cam ring 170. The drive pack assembly 160 is preferably mounted to the pedestal 108 (FIG. 1) of the sandwich maker 100 via any portion of the bottom housing 169, e.g., a screw boss 197 that is fixedly couple thereto.

A hot plate assembly 185 may be attached to a fixed pedestal part (not shown) from underneath of the recessed food pocket 103 for heating the food load. The hot plate assembly 185 may be powered by an electrical power and be controlled, e.g., by closing the heating lid 115 (FIG. 5). Although shown and described as the hot plate assembly 185 for heating the food load for purposes of illustration only, the food load may be heated via any other suitable means.

FIG. 11 shows an underside (bottom side) view of the indexer collar 176. The sandwich maker 100 may be provided with a lock-lever mechanism 358, instead of or in addition to the optional brake element 184 (FIG. 8), for avoiding unwanted motion of the indexer collar 176. A circular rib 357 may be provided at a bottom surface of the indexer collar 176. As shown and described, a plurality of tabs 179, e.g., six, may be attached to the circular rib 357 for being pushed by a plurality of indexer pawls 178, e.g., three, so that the indexer collar 176 may intermittently rotate by a predetermined angle.

A plurality of notches 351 may be provided on the circular rib 357 and in positions directly adjacent to the tabs 179. The number of the notches 351 may be inconsistent with the tabs 179. A lock lever 353 may be pivotally coupled to the underside surface of the indexer collar 176 via a pivot pin 359 so as to be movable thereabout. The lock lever 353 may be movable along an inner profile of the circular rib 357 and be spring-loaded for providing a force against the circular rib 357. The lock lever 353 may be in a shape of "7" with a head portion 355 of the lock lever 353 being able to engage or to clutch into one of the notches 351 to prevent the indexer collar 176 from moving in either direction. A flat surface 356A formed by the head portion 355 may be used to engage the lock lever 353 with one of the notches 351 for preventing the indexer collar 176 from rotating in a clockwise direction. Additionally, a slanted flat surface 356B is also formed by the head portion 355 to engage the indexer pawls 178 with the head portion 355 of the lock lever 353, which exerts a force to rotate the lock lever 353 away from the collar rib 357 and disengage the lock lever 353 from the respective notch 351.

In operation, when the indexer pawls 178 move during rotation of the cam ring 170 (FIG. 6), one of the indexer pawls 178 may be engaged with the slanted surface 356B of the lock lever 353. The head portion 355 of the lock lever 353 may be pushed away from the circular rib 357 and disengages from the notch 351 so as to free the indexer collar 176 to rotate clockwise as the inner profile of the circular rib 357 slides along the slanted flat surface 356B of the lock lever 353. At the end of the engagement with the slanted surface 356B, the indexer pawl 178 may engage with one of the tabs 179 and cause the indexer collar 176 to rotate clockwise such that the lock lever 353 slides along the inner profile of the circular rib 357. When the indexer collar 176 is rotated by the predetermined angle, the spring-loaded lock lever 353 may engage with a successive notch 351. The head portion 355 of the lock lever 353 may prevent the indexer collar 176 from rotating in either clockwise or counter-clockwise directions until being disengaged by one of the indexer pawls 178.

This embodiment allows rotation of the indexer collar 176 by the cam ring 170 through the predetermined angle, and prevents other unwanted motion of the indexer collar 176, e.g., a user's intervention to force a rotation of the indexer collar 176. Accordingly, the indexer collar 176 may be ensured to be in sequence with the cam ring 170.

Figure 12:
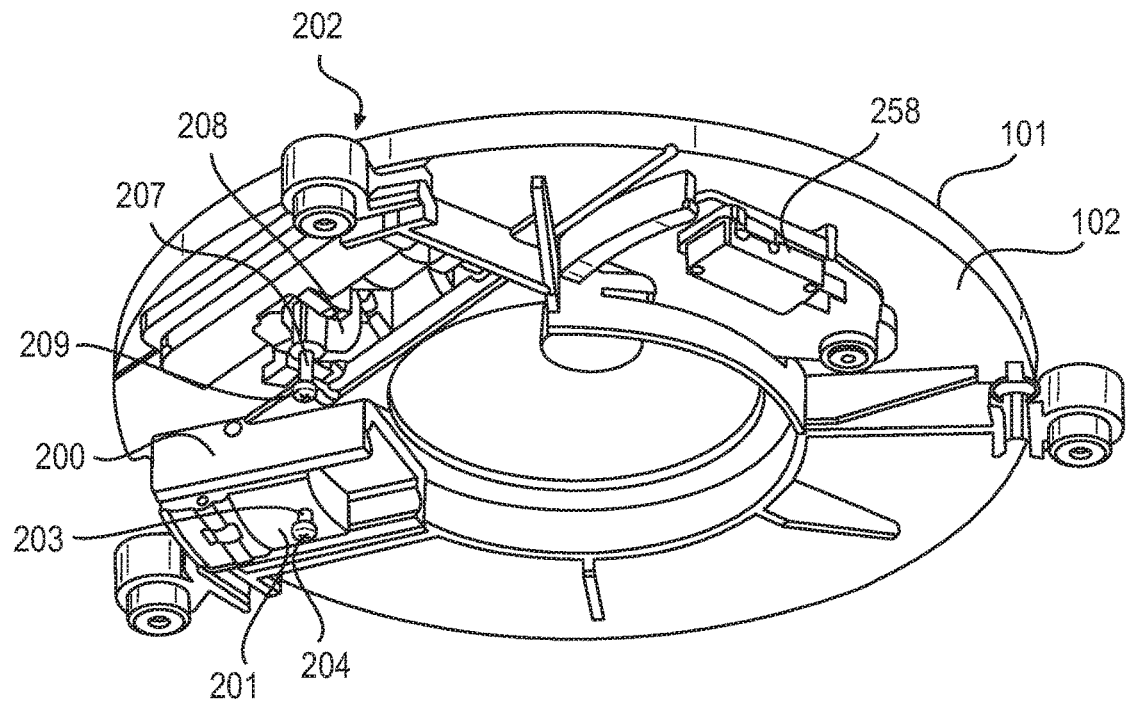
FIG. 12 is a bottom side perspective view of a platform assembly for use with the apparatus of FIG. 1.

FIG. 12 illustrates a bottom view of a platform assembly 202 of the sandwich maker 100. The platform assembly 202 preferably includes the platform 101 having the circular flat surface 102 for supporting the wrap 112 (FIG. 2). The circular flat surface 102 preferably includes a sufficiently large area to support a regular size tortilla, which is commonly eight inches in diameter, although dimensions can vary as needed A pivot lever 208 for actuating the folding paddle 105 (FIG. 1) may be rotatably coupled to the platform 101 and include a downwardly extending follower pin 207 having a sealed follower roller 209 on a free end thereof. The follower roller 209 preferably cooperates with and is guided by the outer cam track 172 of the cam ring 170. The pivot lever 208 and/or the follower roller 209 may be made of a plastic material.

In operation, the platform assembly 202 preferably remains stationary and the cam ring 170 is continuously rotated with respect thereto in order to actuate the folding paddle 105 via the pivot lever 208. Intermittent motion of the folding paddle is achieved via the profile of the outer cam track, as the cam ring 170 rotates continuously. For example, when the follower roller 209 is within the outer section 172A of the outer cam track 172 (FIG. 6), the folding paddle 105 may be at a retracted position to allow the wrap 112 to be rotated; when the follower roller 209 is transiting from outer section 172B to inner section 172A of the outer cam track 172 (or in the transitional section 172C), the folding paddle 105 may be actuated to fold the wrap 112. While the follower roller 209 is within the inner section 172B, the folding paddle 105 preferably holds the wrap 112. When the follower roller 209 is transiting from inner section 172B to the outer section 172A, the folding paddle 105 preferably retracts.

A ball-bearing supported carrier 201 for actuating the holding arm 106 may be slidably coupled to the circular flat surface 102 and include a vertically extending follower pin 203 and a follower roller 204 at a free end of the follower pin 203. The follower roller 204 may cooperate with and be guided by the inner track 173 of the cam ring 170. The carrier 201 and/or the follower roller 204 may be made of a plastic material. The carrier 201 is preferably slidably arranged within a carrier track 200 that extends in a generally radial direction.

In operation, when the cam ring 170 rotates with respect to the platform assembly 202, and the follower roller 204 is in the convex section 173A of the inner cam track 173 (FIG. 6), the holding arm 106 may be actuated to hold the wrap 112; when the follower roller 204 transits to a concaved section 173B, the holding arm 106 may be retracted for allowing the holding arm to release its hold on the previous pleat, and actively hold the most recent pleat. The holding arm 106 may transit to hold the wrap 112 again when the follower roller 204 is guided to the next convex section 173A. The follower roller 204 may be diverted to an inner circular section 173C for keeping the holding arm 106 in the retracted position.

A stop switch 258 may be provided for stopping or completing a folding process. The stop switch 258 may be coupled underneath the circular flat surface 102 and may be actuated by a particular position of the indexer collar 176 and the cam ring 170. Additional detail regarding the stop switch 258 will be provided below.

FIG. 13 illustrates an exemplary holding arm 106 that preferably includes an arm body 213 and is rotatably coupled to and driven by the ball-bearing carrier 201. The arm body 213 pivots about a pivot pin 217 that extends laterally therethrough and into the platform 101. The arm body 213 further includes an elongated drive slot (not shown) through which a drive pin 219 of the ball-bearing carrier 201 extends. As the ball-bearing carrier 201 is guided and reciprocated back and forth within the carrier track 200 by movement of the follower roller 204 along the inner cam track 173 of the cam ring 170, the drive pin 219 moves within the drive slot, causing the arm body 213 to pivot about the pivot pin 217.

A pivoting shaft 211 (or a holder gimbal) may be associated with the holding arm 106 via a generally annular pivot joint 214, that is located at an end of the arm body 213 distal from the ball-bearing carrier 201. The pivoting shaft 211 is generally vertically suspended from the pivot joint 214 to extend toward the platform 101. The pivoting shaft 211 may pivot about the pivot point 214 to provide various angles for contacting the wrap 112 and for allowing the rotating tip 212, positioned at an end of the pivoting shaft 211 opposite to the pivot joint 214, to easily detach from a pleat of the wrap 112. Preferably, the rotating tip 212 is freely rotatable through three-hundred and sixty degrees to follow an indexing motion of the food load, for the purpose, e.g., of holding a folded pleat of the wrap as successive interlacing pleats are being folded.

Although shown and described as an integrated piece for purposes of illustration only, the holding arm 106 may be provided with a hinge at a location identified by a designator 215 for a purpose of storing and/or transporting the sandwich maker 100. In some embodiments, the hinge may be spring-loaded to provide a means of adjusting a force applied to the food load with varying thickness.

FIGS. 14 and 15 show an exemplary folding paddle 105 for use in the sandwich maker 100. As previously described, the folding paddle 105 may be a two part assembly including a lower paddle 105A and an upper paddle 105B. The lower paddle 105A is preferably rotatably connected to the platform 101 via a first hinge 233 and may fold to an angle that is approximately perpendicular to the circular flat surface 102. The lower paddle 105A may be spring-loaded such that the lower paddle 105A may be retracted if/when no other force is exerted on the lower paddle 105A.

The upper paddle 105B is preferably rotatably coupled to the lower paddle 105A via a second hinge 231 and may fold to an angle that is approximately perpendicular to the lower paddle 105A. The second hinge 231 may be configured to allow the upper paddle 105B to move downward for pressing a food load, such as for allowing the heating lid 115 (FIG. 5) to contact the food load. The upper paddle 105B also may be spring loaded such that the upper paddle 105B may return to a position in alignment with the lower paddle 105A when no other force is exerted on the upper paddle 105B. The first and second hinges 233, 231 may be rotatably connected to brackets 299 which rotate along with the lower paddle 105A and/or support rotation of the upper paddle 105B.

A lever plate 225 is preferably rotatably connected to the platform 101 at a hinge point 234, with an opposing end movable connected to the brackets 299. The lever plate 225 includes a sliding cam interface 235, including, but not limited to, a lower cam 238A, an upper cam 238B, and a sliding pin 232. The sliding pin 232 may be disposed within guide slots 236 of the brackets 299 for movement therein. The geometry of the sliding cam interface 235 preferably maximizes a driving ability for the upper paddle 105B and lower paddle 105A to exert a force to the sandwich to ensure proper folding. The previously described pivot lever 208 includes a lever pin 237 that moves within a sliding slot 272 of the sliding plate 225. The previously described downwardly extending follower pin 207 with its associated follower roller 209 are coupled to the pivot lever 208 via a third hinge 239. The follower pin 207 is preferably guided by the outer cam track 172 of the cam ring 170 to either push or release the lever plate 225 via the pivot lever 208.

In operation, when the follower roller 209 is guided to move back or forth in the outer cam track 172, a lever pin 237 moves within the sliding slot 272, which drives the sliding pin 232 up or down within the guide slots 236 of the brackets 299. When the sliding pin 232 moves downward within the guide slots 236, the upper cam surface 238B may be released or disengaged and the upper paddle 105B may be retracted to a vertically oriented position by a spring-loaded force of the second hinge 231. As the sliding pin 232 moves further downward within the guide slots 236, the lower cam surface 238A may be released or disengaged, and the lower paddle 105A and the upper paddle 105B may both be retracted to a position that may be level with the circular flat surface 102. When the sliding pin 232 moves upward within the guide slots 236, the sliding pin 232 may engage the lower cam surface 238A of the lower paddle 105A to stand the lower paddle 105A up vertically, and then, may engage the upper cam surface 238B of the upper paddle 105B to fold the upper paddle 105B over horizontally.

In some embodiments, the upper paddle 105B will return to its downward retracted position as soon as it is released by the user, if the user was holding it from following its natural motion, even if the lever plate 225 has already fully retracted. If the user tries to stop the lower paddle 105A from retracting, the cam ring 170 may exert up to a force exceeding a predetermined threshold, and a torque limit switch may be triggered for cutting off the drive power to a driving motor 161. Similarly, if the user attempts to stop a motion of the holding arm 106 in either direction, the torque limit switch may also be triggered to cut off the power to the driving motor.

FIG. 16 shows the stop switch 258 for returning the sandwich maker 100 to a start position or an initial state. In FIG. 16, the stop switch 258 may be attached to a switch platform 256 that may be may be associated with the platform assembly 202 (FIG. 12). The switch platform 256 may be pivoted about a platform pivot axis 257 and be spring-loaded with a force exerted against the indexer collar 176. The switch platform 256 may be configured to have a cam surface 254 that does not ordinarily interfere with a rotation of the indexer collar 176 when the cam surface 254 is not engaged with a bulge 255 attached to the indexer collar 176.

Preferably, the indexer collar 176 includes at least one bulge 255 that is arranged at a position that may engage the switch platform 256 at the cam surface 254 when a final pleat of a sandwich (not shown) is completed. In some embodiments, the final pleat may be held by the folding paddle 105, with the holding arm 106 being at a retracted position. When the bulge 255 is engaged with the switch platform 256, the switch platform 256 is urged away from the indexer collar 176. As a result, the stop switch 258 engages with a switch actuator tab 251 arranged at a periphery of the cam ring 170, thereby cutting off power to the motor 161.

One or more switch actuator tabs 251 may be attached to the cam ring 170 for actuating the stop switch 258. The bulge 255 may cooperate with the switch actuator tabs 251 in a manner such that, the stop switch 258 may not be actuated in a first rotation of the cam ring 170 and be actuated in a second rotation of the cam ring 170. In other words, the cam ring 170 may perform two full rotations per folding cycle of the sandwich maker 100.

Additionally, a removable grip ring 253 may be provided to positively engage the sandwich for reliable and accurate rotation of the sandwich. The positive engagement may be performed by a plurality of raised ridges 259 on the grip ring 253 that frictionally engage with the wrap 112 as the food ingredients 111 sink the wrap 112 into the recessed food pocket 103. The grip ring 253 may eliminate or reduce an unwanted motion or the wrap with respect to the grip ring 253. Although shown and described as using the removable grip ring 253 for purposes of illustration only, any other suitable means may be used to enhance the grip with the wrap to reduce unwanted motion of the wrap.

Figure 17:
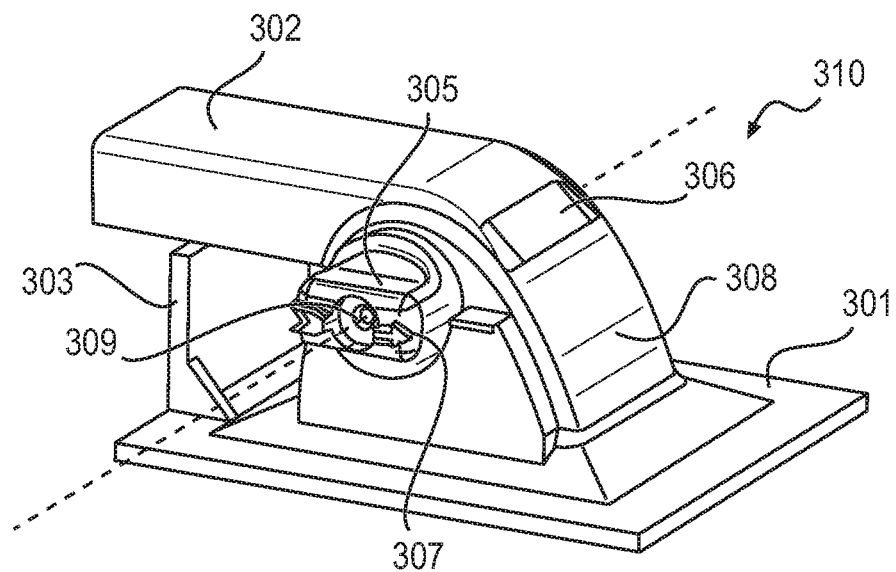
FIG. 17 is a perspective view of a holding mechanism of the apparatus of FIG. 1.

FIG. 17 shows an exemplary holding mechanism 310 for locking the heating lid 115 (FIG. 5) in a storage position. As shown and described above, the heating lid 115 may be in a storage position when the sandwich maker 100 is not in use. When in the storage position, the heating lid 115 may be closed towards the circular flat surface 102.

In some embodiments, the heating lid 115 may be held (or locked) at the storage position with the holding mechanism 310. The holding mechanism 310 may be a "turn-to-lock" mechanism that includes a turn knob 305 for locking the holding mechanism 310. The holding mechanism 310 may include a hinge pedestal 301 that is coupled to the pedestal 108 (FIG. 1) of the sandwich maker 100 and/or associated with any structure that is coupled with the pedestal 108.

The hinge pedestal 301 may include a housing 308 for enclosing and/or supporting an actuator crank 309. A hinge arm 302 for attaching to the heating lid 115 may be provided to pivot about the actuator crank 309 for providing at least two stable positions thereof, one being a lowered position (or closed position) and the other one being a lifted position (or an open position). At the lowered position, the hinge arm 302 may be supported by a stopper 303 that is a structure included in or attached to the hinge pedestal 301 for restricting downward rotation of the hinge arm 302.

A knob 305 may be coupled to the actuator crank 309 for restricting pivoting of the hinge arm 302 about the actuator crank 309. The knob 305 may be provided with at least two positions, a lock position and an unlock position. When the knob 305 is turned to the lock position, e.g., when the arrow on the knob 305 is pointing toward the word "lock,", the hinge arm 302 may be locked in the storage position. When the knob 305 is turned to a direction other than the lock position, the hinge arm 302 rotated up, so as to be able to lift the heating lid 115 to its open position.

Figure 18:
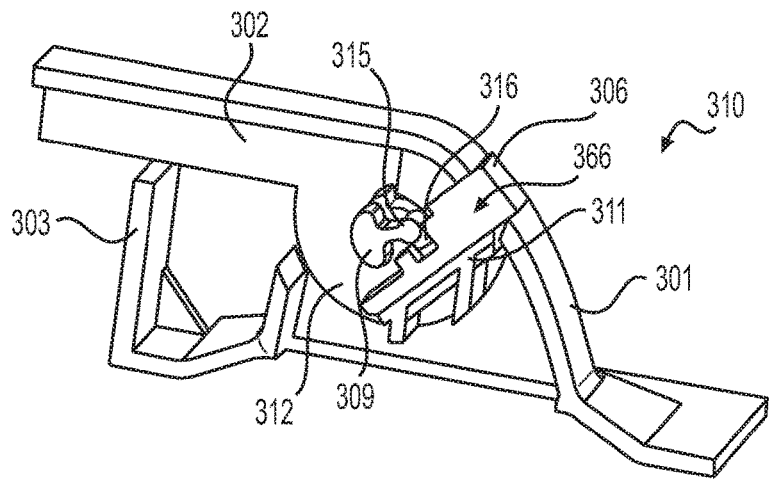
FIG. 18 is a perspective cross-sectional view of the holding mechanism of FIG. 17.

FIG. 18 is a cross-sectional view of the holding mechanism 310. Referring to FIGS. 17 and 18, the hinge arm 302 may include a circular portion 312 that may be pivotally coupled to the hinge pedestal 301 via the actuator crank 309. The actuator crank 309 may be coupled with the circular portion 312 of the hinge arm 302 and may pivot with respect to the hinge pedestal 301. The actuator crank 309 may include an actuator lobe 315 as a section thereof, for restricting the pivoting of the actuator crank 309. A lock pawl 306 may be attached to the hinge pedestal 301 and be provided with a slot 316 for cooperating with the actuator lobe 315.

When the knob 305 is turned to the lock position, the actuator lobe 315 may press the lock pawl 306 in a first direction 366 along a guide plate 311 that is attached to the hinge pedestal 301 for guiding the sliding motion of the lock pawl 306. The actuator lobe 315 may be clutched into the slot 316 to restrict the lock pawl 306 from moving away from the lock position, and thus, the hinge arm 302 may be prevented from pivoting with respect to the hinge pedestal 301 due to abutment with the lock pawl 306. When the knob 305 is turned to a position other than the lock position, the actuator lobe 315 may push the lock pawl 306 to slide in a reverse direction of the first direction 366 along the guide plate 311. The circular portion 312 of the hinge arm 302 may be released and be freed for pivoting about the actuator crank 309 and, therefore, the heating lid 115 may be lifted to its open position.

In some embodiment of the disclosure, the hinge pedestal 301, the hinge arm 302, the guide plate 311, the lock pawl 306 and/or the knob 305 may be made from plastic materials or other suitable materials that may provide light and robust structures therefore.

Figure 19:
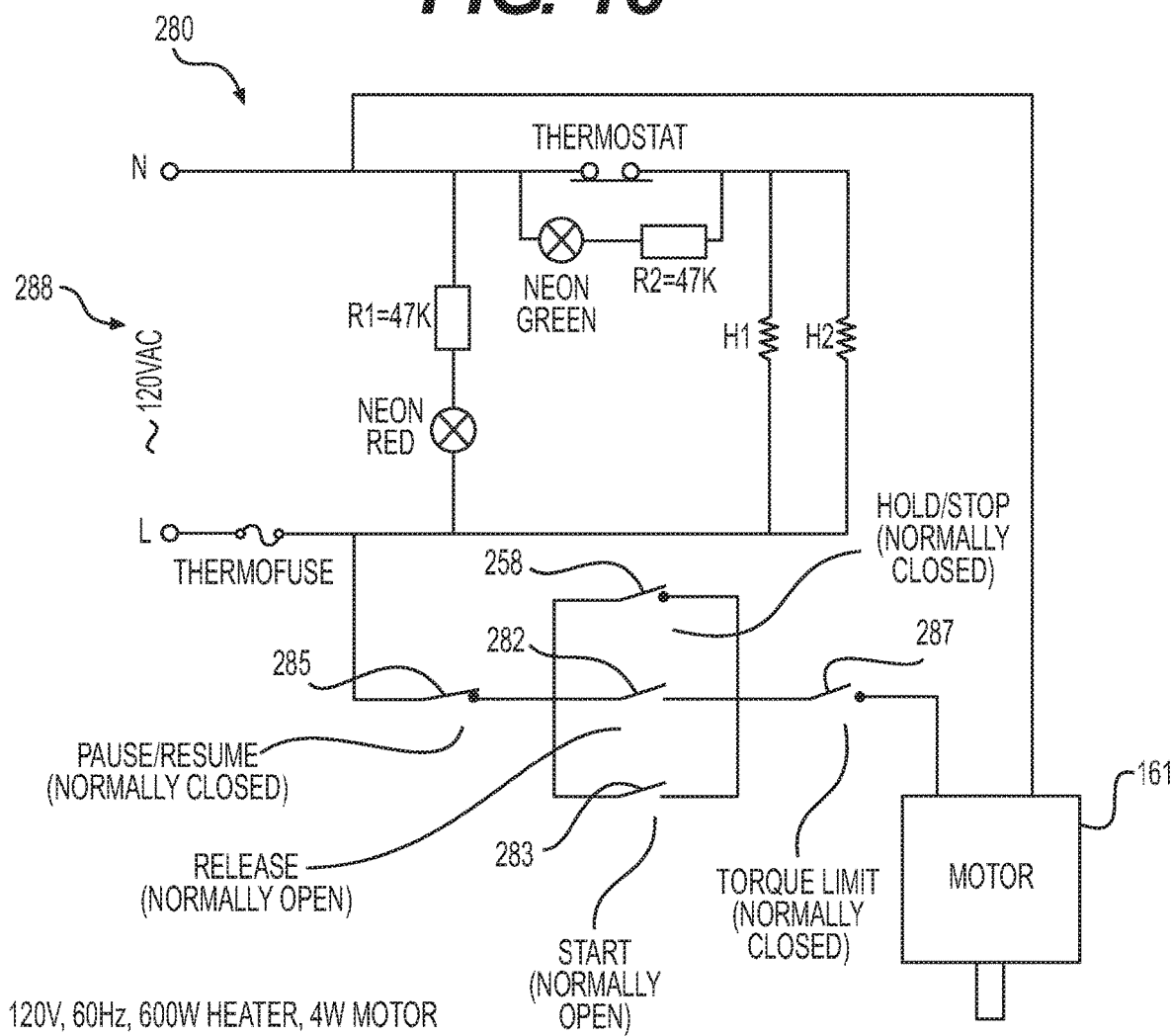
FIG. 19 is a partial circuit schematic diagram related to electrical components of the apparatus of FIG. 1.

FIG. 19 shows an exemplary control circuit 280 for use with the sandwich maker 100. In FIG. 19, the control circuit 280 controls the provision of current from a power supply 288 to the motor 161. The control circuit 280 includes the stop switch 258 described above. The stop switch 258 is preferably normally closed for connecting the power supply 288 to the motor 161. When the stop switch 258 is triggered to open, the power supply 288 to the motor 161 may be disconnected unless a release switch 282 and/or a start switch 283 is activated to close. As described above, the stop switch 258 preferably cooperates with cams, such as the bulge 255, for automatically stopping the motor 161 at a start position of the sandwich maker 100 for returning it to initial state.

The release switch 282 and the start switch 283 are preferably normally open switches and may be different or similar to the stop switch 258. The release switch 282 and/or the start switch 283 are preferably electrically connected in parallel with the stop switch 258 and may by-pass the stop switch 258 when the release switch 282 or the start switch 283 is closed.

The control circuit 280 may include one or more auxiliary switches, e.g., a pause-resume switch 285, which allow a user to interrupt a folding process of the sandwich maker 100 at any selected time. For example, the user may interrupt the folding process for a purpose of rearranging a food load and the like. In some embodiments, the pause-resume switch 285 may be a pushbutton that is configured to be labeled as "push to pause" and/or "push to resume."

Additionally and/or alternatively, the control circuit 280 may include a torque limit switch 287 for stopping and/or locking out an operation of the motor 161 if a load of the motor 161 exceeds a predetermined load threshold. In other words, the torque limit switch 287 may be configured to prevent undue load on the motor 161. In some embodiments, the motor 161 may be mounted on a spring-loaded platform (not shown) that changes a position when a torque acting on the motor 161 exceeds the predetermined torque threshold. The change of position may permit a spring-loaded peg (not shown) to move for tripping the torque limit switch 287 and to provide a means of holding the spring-loaded platform from returning to an operating position until the user has cleared a condition causing the overload, and manually resets the torque limit switch 287.

In some embodiments, an electronic control chip circuit (not shown) may be provided to allow momentary contact of the release switch 282 and/or the start switch 283, and to automatically operate a by-pass relay switch (not shown) for an appropriate amount of time for the cams to clear the stop switch 258. Although shown and described as using the stop switch 258, the release switch 282, the start switch 283, the pause/release switch 285, and the torque limit switch 287 for purposes of illustration only, the control circuit 280 may include any other suitable control and/or protective switches and/or other electrical elements.

Figure 20A:
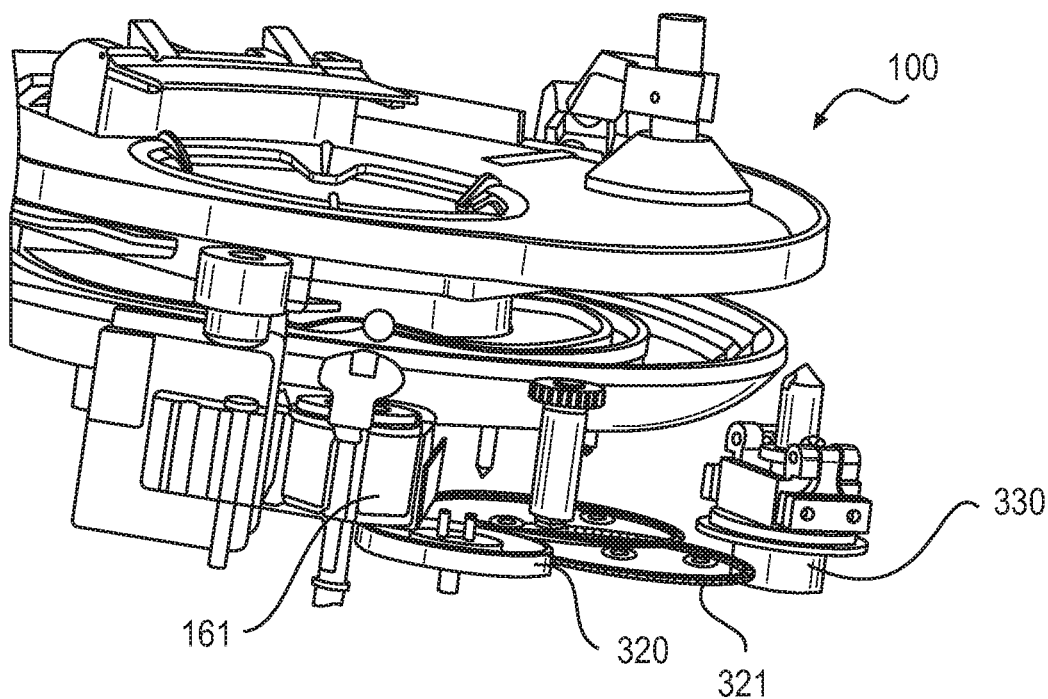
FIG. 20A is a perspective, partially transparent view of various components of the apparatus of FIG. 1 assembled together with a centrifugal switch assembly.
Figure 20B:
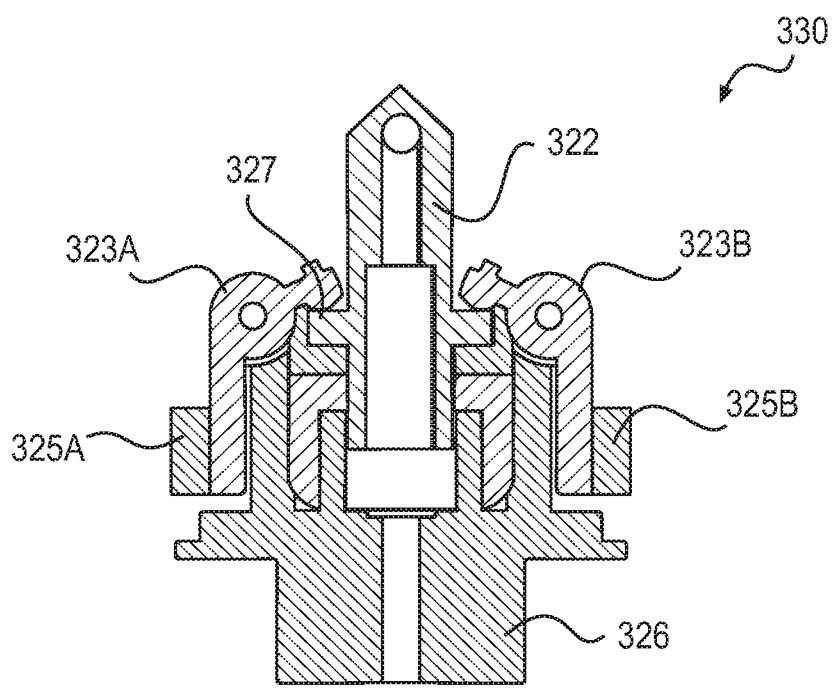
FIG. 20B is a perspective view of the centrifugal switch assembly of FIG. 20A.

FIGS. 20A and 20B show the pause/release switch 285 (FIG. 19) in the form of a centrifugal switch assembly 330. The centrifugal switch assembly 330 may be engaged with a gear 321 of a speed reduction mechanism 320 of the sandwich maker 100. The speed reduction mechanism 320 may be engaged with the motor 161 of the sandwich maker 100 for transmitting rotational power from the motor 161 to rotating components of the sandwich maker 100. The speed reduction mechanism 320 may include one or more gears, pinions and/or other components (not shown) for transmitting rotation.

The centrifugal switch assembly 330 may include one or more flyweight pivots 323A, 323B, each of which includes a respective flyweight 325A, 325B on an end thereof. The flyweight pivots 323A, 323B may be pivoted such that the fly weights 325A, 325B are lifted through a centrifugal force during rotation about a longitudinal axis of the speed reduction mechanism 320 (generated, for example, by rotation of the gear 321). The lifting of the fly weights 325A, 325B consequently lowers opposite ends of the flyweight pivots 323A, 323B. A centrifugal actuator 322 may include a shoulder 327 that may be engaged by the flyweight pivots 323A and 323B during pivoting. The pause/release switch 285 may be associated with the centrifugal actuator 322 for connecting or disconnecting the control circuit 280 (FIG. 19).

When a rotational speed of the gear 321 is below a predetermined threshold, e.g., five hundred RPM, the centrifugal actuator 322 may not be lowered enough to actuate the pause/release switch 285 and, therefore, the pause/release switch 285 stays connected. When the spin speed of the gear 321 reaches above the predetermined threshold, the fly weight pivots 323A, 323B engage the shoulder 327 sufficiently to lower the centrifugal actuator 322 and disconnect the pause/release switch 285 and the control circuit 280. The pause/release switch 285 may remain disconnected while the rotational speed of the gear 321 is above the predetermined threshold, and reconnect when the rotational speed of the gear 321 is lowered below the predetermined threshold.

In some embodiments, the centrifugal switch assembly 330 may be a stand-alone module that is not integrated to a shaft of the motor 161 or to the gear 321 and, therefore, the centrifugal switch assembly 330 may be an optional component.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. An apparatus for making a pocket sandwich, comprising:

a platform having a surface configured to support a wrap;

a food pocket arranged at a center of the platform and being rotatable with respect thereto about an axis arranged generally perpendicular to the surface of the platform;

a folding paddle hingedly mounted to the platform such that the folding paddle is configured to rotate toward and away from the center of the platform, the folding paddle being placed at a location with respect to the platform such that motion of the folding paddle toward the center of the platform folds a portion of the wrap on itself so as to generate a folded pleat; and a holding arm having an arm body with a tip at a free end thereof, the tip and at least a portion of the arm body being disposed above the surface of the platform, the tip being movable in at least a vertical direction toward and away from the center of the platform, wherein the holding arm is configured to contact the wrap and hold the folded pleat in place while the food pocket rotates a predetermined angle with respect to the platform to permit the folding paddle to generate a successive folded pleat in the wrap.

2. The apparatus of claim 1, further comprising a motor for driving at least rotation of the food pocket.

3. The apparatus of claim 2, wherein the motor is configured to rotate the food pocket in sixty degree increments.

4. The apparatus of claim 1, further comprising:
a pedestal supporting the platform, the food pocket, the folding paddle, and the holding arm; and
a lid hingedly attached to the pedestal.

5. The apparatus of claim 4, further comprising:
a first heating element contained within the pedestal and proximate the food pocket; and
a second heating element contained within the lid.

6. The apparatus of claim 4, further comprising a holding mechanism for maintaining the lid adjacent to the pedestal in a storage position, wherein the holding mechanism is provided with a knob for selectively locking the lid in the storage position.

7. The apparatus of claim 1, further comprising a cam ring disposed below the platform and being rotatable with respect thereto, the cam ring including a first cam track configured to guide movement of the folding paddle and a second cam track configured to guide movement of the holding arm.

8. The apparatus of claim 7, further comprising an indexer collar coupled to the food pocket and cooperative with the cam ring for rotating the food pocket by the predetermined angle to generate the successive folded pleat in the wrap.

9. The apparatus of claim 8, further comprising a lock lever pivotally coupled to the indexer collar for preventing a motion of the indexer collar other than that generated by a rotation of the cam ring.

10. The apparatus of claim 7, further comprising a motor for driving at least rotation of the food pocket and the cam ring.

11. The apparatus of claim 10, further comprising a centrifugal switch assembly associated with the motor for preventing a rotational speed of the motor from exceeding a predetermined speed threshold.

12. The apparatus of claim 1, wherein a bottom surface of the food pocket is recessed with respect to the surface of the platform.

13. The apparatus of claim 1, wherein the food pocket includes a grip ring with a plurality of raised ridges configured to engage the wrap.

14. The apparatus of claim 1, wherein the folding paddle includes:
a lower paddle movable from a first position wherein the lower paddle lies substantially in a plane of the surface of the platform to a second position that is oriented generally perpendicularly with respect to the surface of the platform; and
an upper paddle hingedly connected to the lower panel and movable from a first position wherein the upper paddle lies substantially in the plane of the surface of the platform to a second position that is oriented vertically above and generally parallel to the surface of the platform.

15. The apparatus of claim 1, wherein the tip of the holding arm is rotatable with respect to the arm body.

16. The apparatus of claim 1, wherein the arm body is rotatable with respect to the platform.

17. A method for making a pocket sandwich with a wrap and food ingredients, comprising:
(a) providing a platform having a surface configured to support the wrap, and a food pocket arranged at a center of the platform and being rotatable with respect thereto about an axis arranged generally perpendicular to the surface of the platform;
(b) folding the wrap from one direction with a folding paddle hingedly connected to the platform to generate a pleat in the wrap;
(c) holding the folded pleat with a holding arm;
(d) rotating the food pocket and the wrap by a predetermined angle while the folded pleat is held by the holding arm; and
repeating steps (b)-(d) until a predetermined number of pleats are completed.

18. The method of claim 17, further comprising:
(e) rotating the holding arm with respect to the platform during rotation of the food pocket and the wrap.

19. The method of claim 17, wherein the holding arm includes an arm body and a tip located at a free end of the arm body, the tip being rotatable with respect to the arm body, and the method further comprises:
(e) rotating the tip of the holding arm during rotation of the food pocket and the wrap.

20. The method of claim 17, further comprising:
(e) heating the folded wrap having the predetermined number of pleats from at least two directions while the folded wrap is on the food pocket.

* * * * *